United States Patent
Puttagunta et al.

(10) Patent No.: US 10,841,169 B2
(45) Date of Patent: Nov. 17, 2020

(54) STORAGE AREA NETWORK DIAGNOSTIC DATA

(71) Applicant: HEWLETT PACKARD ENTERPRISE DEVELOPMENT LP, Houston, TX (US)

(72) Inventors: Krishna Puttagunta, Roseville, CA (US); Rupin T. Mohan, Andover, MA (US); Vivek Agarwal, Andover, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 51 days.

(21) Appl. No.: 15/762,015

(22) PCT Filed: Nov. 2, 2015

(86) PCT No.: PCT/US2015/058555
§ 371 (c)(1),
(2) Date: Mar. 21, 2018

(87) PCT Pub. No.: WO2017/078662
PCT Pub. Date: May 11, 2017

(65) Prior Publication Data
US 2018/0278484 A1 Sep. 27, 2018

(51) Int. Cl.
*H04L 12/24* (2006.01)
*H04L 12/939* (2013.01)
(Continued)

(52) U.S. Cl.
CPC ............ *H04L 41/14* (2013.01); *H04L 43/065* (2013.01); *H04L 43/10* (2013.01); *H04L 49/356* (2013.01);
(Continued)

(58) Field of Classification Search
CPC ..... H04L 41/14; H04L 43/065; H04L 49/356; H04L 67/1097; H04L 41/12; H04L 69/12;
(Continued)

(56) References Cited

U.S. PATENT DOCUMENTS 6,381,642 B1 * 4/2002 O'Donnell .............. H04L 43/00
709/224
7,103,504 B1 * 9/2006 McGlaughlin ...... G06F 11/0709
702/182

(Continued)

FOREIGN PATENT DOCUMENTS

EP 1115225 A2 7/2001
EP 2775678 A1 9/2014

OTHER PUBLICATIONS

Brocade Communications Systems, Inc., "Data Center Operational Simplicity: Automating and Simplifying SAN Provisioning," Apr. 14, 2011, 11 pages, https://www.hds.com/assets/pdf/data-center-operational-simplicity-automating-and-simplifying-san-provisioning.pdf.

(Continued)

*Primary Examiner* — Ninos Donabed
(74) *Attorney, Agent, or Firm* — Hewlett Packard Enterprise Patent Department

(57) ABSTRACT

An example implementation may relate to a storage area network (SAN) switch and a SAN target device. For example, the SAN target device may issue an in-band diagnostic command to the SAN switch. The SAN target device may receive an in-band data message from the SAN switch in response to the in-band diagnostic command. The in-band data message may include diagnostic data about a port of the storage area network switch and a storage area network device connected to the port.

19 Claims, 7 Drawing Sheets

(51) Int. Cl.
*H04L 12/26* (2006.01)
*H04L 12/931* (2013.01)
*H04L 29/08* (2006.01)

(52) U.S. Cl.
CPC ........ *H04L 49/555* (2013.01); *H04L 67/1097* (2013.01)

(58) Field of Classification Search
CPC ....... H04L 69/16; H04L 69/161; H04L 69/32; H04L 41/0213; H04L 69/24; H04L 29/06; H04L 41/082; H04L 67/16; H04L 69/329; G06F 3/0607; G06F 3/067; G06F 3/065; G06F 2201/84; G06F 3/0605; G06F 3/0659; G06F 3/0665; G06F 11/0727; G06F 11/2089; G06F 3/0604
See application file for complete search history.

(56) References Cited

U.S. PATENT DOCUMENTS

| | | | |
|---|---|---|---|
| 7,136,907 B1* | 11/2006 | Nordstrom | G06F 15/16 709/220 |
| 7,197,576 B1 | 3/2007 | Lo et al. | |
| 7,328,260 B1* | 2/2008 | Muthiyan | H04L 41/0681 709/220 |
| 7,398,421 B1* | 7/2008 | Limaye | H04L 69/40 714/16 |
| 7,401,338 B1* | 7/2008 | Bowen | H04L 41/5035 709/200 |
| 7,506,040 B1 | 3/2009 | Rabe et al. | |
| 7,685,269 B1* | 3/2010 | Thrasher | G06F 11/3034 709/224 |
| 7,882,393 B2 | 2/2011 | Grimes et al. | |
| 8,019,849 B1* | 9/2011 | Lopilato | G06F 16/1827 709/223 |
| 8,060,630 B1 | 11/2011 | Jancaitis et al. | |
| 9,098,200 B2* | 8/2015 | Nakajima | G06F 3/0605 |
| 2002/0103913 A1* | 8/2002 | Tawil | G06F 13/387 709/229 |
| 2005/0094630 A1* | 5/2005 | Valdevit | H04L 45/12 370/360 |
| 2005/0165667 A1* | 7/2005 | Cox | G06Q 20/10 705/35 |
| 2007/0073633 A1 | 3/2007 | Gallant et al. | |
| 2008/0250042 A1* | 10/2008 | Mopur | G06F 11/0727 |
| 2009/0070092 A1* | 3/2009 | Dickens | H04L 67/1097 703/21 |
| 2009/0259749 A1 | 10/2009 | Barrett et al. | |
| 2010/0002588 A1 | 1/2010 | Cantwell et al. | |
| 2010/0275219 A1* | 10/2010 | Carlson | G06F 3/0605 719/326 |
| 2013/0212345 A1* | 8/2013 | Nakajima | G06F 3/0605 711/161 |
| 2014/0089735 A1* | 3/2014 | Barrett | G06F 11/3495 714/27 |
| 2014/0149530 A1 | 5/2014 | Dietz et al. | |
| 2015/0046668 A1* | 2/2015 | Hyde, II | G06F 3/0689 711/162 |
| 2015/0324126 A1* | 11/2015 | Nakajima | G06F 3/0647 711/114 |
| 2016/0224482 A1* | 8/2016 | Murata | G06F 3/0659 |

OTHER PUBLICATIONS

Hewlett-Packard Development Company, L.P., "HP 3PAR Smart SAN 1.0 User Guide", 34pp, Aug. 2015.
International Search Report & Written Opinion received in PCT Application No. PCT/US2015/058555, Aug. 2, 2016, 13 pages.
Yudenfriend H., "Get More Out of Your IT Infrastructure with IBM Z13 I/O Enhancements," Feb. 4, 2015, 30 pages, http://www.redbooks.ibm.com/redpapers/pdfs/redp5134.pdf.

* cited by examiner

US 10,841,169 B2

STORAGE AREA NETWORK DIAGNOSTIC DATA

BACKGROUND

A storage area network (SAN) may provide access and connectivity between interconnected servers and storage devices. A SAN may include network switches to route data traffic between servers and storage devices. A SAN may be monitored to detect failing or failed components.

BRIEF DESCRIPTION OF THE DRAWINGS

Various examples will be described below with reference to the following figures.

Figure 1:
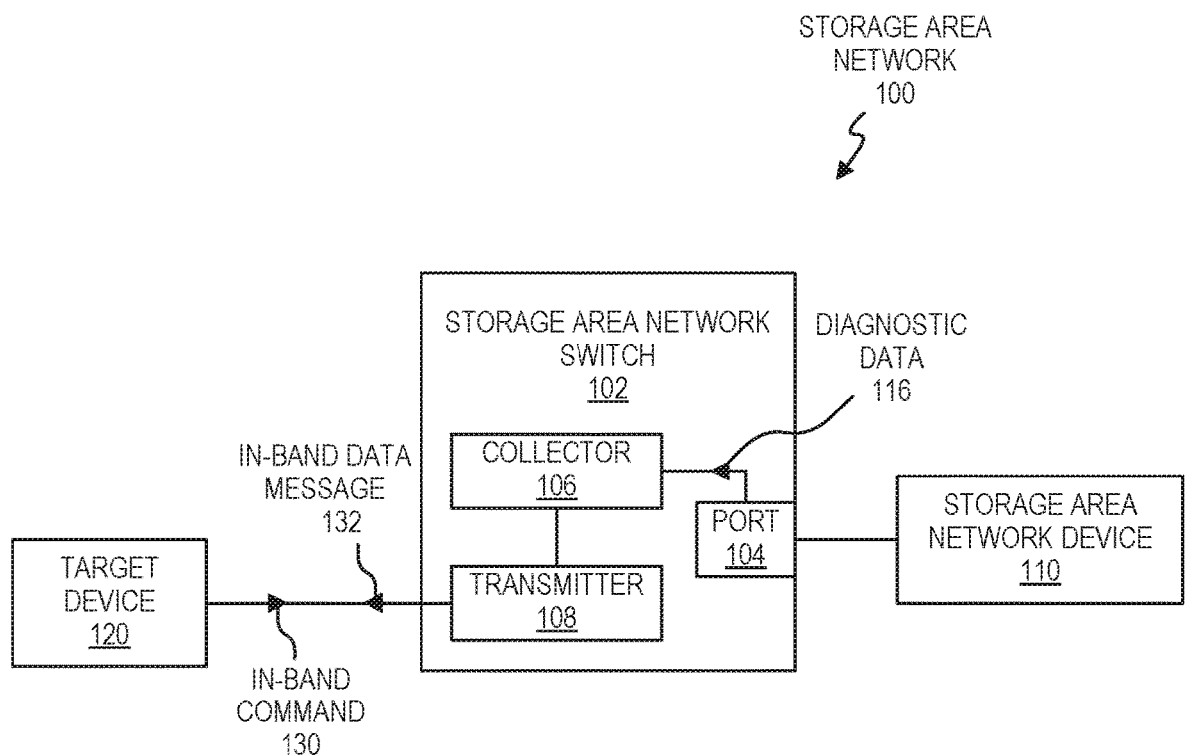
FIG. 1 is a block diagram that depicts an example storage area network in which diagnostic data can be sent to a storage area network target device, according to an implementation.

Throughout the drawings, identical reference numbers may designate similar, but not necessarily identical, elements. A hyphenated index number "N" appended to some of the reference numerals may be understood to merely denote plurality and may not necessarily represent the same quantity for each reference numeral having such an index number "N". Additionally, use herein of a reference numeral without a hyphenated index number, where such reference numeral is referred to elsewhere with a hyphenated index number, may be a general reference to the corresponding plural elements, collectively or individually.

DETAILED DESCRIPTION

A storage area network (SAN) may include interconnected switches that provide access and connectivity between computing devices such as servers (also referred to as initiators) and storage devices (also referred to as target devices). It may be desirable to employ features to avoid downtime in a SAN environment. For example, a SAN may employ monitoring of diagnostic data to detect failing or failed components, among the switches, the initiators, and the target devices. More particularly, a SAN may implement monitoring of diagnostic data related to ports of the components. However, monitoring may involve multiple protocols and out-of-band management interfaces, which may result in a complex and time consuming process. Moreover, some monitoring protocols and interfaces are manually operated, which may be inefficient for SANs that have many components and many ports among the components.

Example techniques of the present application may relate to, among other things, a SAN target device that determines a diagnostic query strategy based on topology information about the SAN fabric. The SAN target device may issue, to a switch included in the SAN fabric, an in-band diagnostic command requesting diagnostic data about at least a port of the switch and a SAN device connected to the port, in accordance with the determined diagnostic query strategy. The SAN target device may receive, from the switch and in response to the in-band diagnostic command; an in-band data message that includes the requested diagnostic data. Accordingly, the systems and techniques of the present description may be useful for accessing diagnostic data about a SAN in a streamlined manner from a target device.

Referring now to the figures, FIG. 1 is a block diagram of an example storage area network 100. The SAN 100 may include a SAN switch 102 that connects a storage area network device 110 and a target device 120. A SAN switch may also be referred to herein as a "switch," and a target device may also be referred to herein as a "SAN target device." The SAN switch 102 may include a port 104 to connect with the SAN device 110. The SAN switch 102 may route data packets between the SAN device 110 and the target device 120 according to block storage protocols such as, for example, Fibre Channel Protocol, Internet Small Computer System Interface (iSCSI), ATA over Ethernet (AoE), Fibre Channel over Ethernet (FCoE), and the like. It should be appreciated that the term "switch" can include other devices for connecting a SAN device and a target device in a SAN, such as suitable routers, gateways, and other devices that can provide switch-like functionality for a SAN.

In some examples, the SAN device 110 may be a computing device, such as a server, a desktop computer, a workstation, a laptop computer, or the like, in which case the SAN device 110 may be referred to as an "initiator," by virtue of such a computing device SAN device 110 being able to initiate a data transfer session (e.g., a session using Fibre Channel Protocol, iSCSI, AoE, FCoE, or the like) with the target device 120 via the SAN switch 102. In some examples, the SAN device 110 may be another SAN switch or a target device.

The target device 120 may include a storage device, such as a disk array, a tape library, optical storage devices, or the like. The target device 120 may respond to data transfer commands sent by an initiator SAN device 110, via the SAN switch 102.

The SAN switch 102 also includes a collector 106 and a transmitter 108. The collector 106 and the transmitter 108 may each include a series of instructions encoded on a machine readable storage medium and executable by a processor or processors (e.g., a microprocessor, an application specific integrated circuit (ASIC), a field programmable gate array (FPGA), and/or other hardware device suitable for retrieval and/or execution of instructions), and additionally or alternatively, may include one or more hardware devices including electronic circuitry or logic for implementing functionality described herein.

The collector 106 may poll diagnostic data 116 from the port 104 and from the SAN device 110 connected to the port 104. More particularly, the SAN device 110 may include a port or ports, about which the collector 106 polls diagnostic data 116. In some implementations, the diagnostic data 116 may relate to operating characteristics at a physical layer (i.e., the network hardware transmission technology underlying the data transmission), a data link layer (i.e., the network layer that transfers data between adjacent network nodes and may detect and correct errors in the physical layer), or the like. For example, the diagnostic data 116 may relate to operating statuses of a transceiver of the port 104 and a transceiver of the SAN device 110. In some implementations, the diagnostic data 116 may include a transmit power, a receive power, a transceiver temperature, a supply voltage, a transmitter bias current, an error counter, an operating link speed, link error status parameters, and/or other such diagnostic data.

Transmit power may represent or relate to, for example, an output power of the port 104 or of a port of the SAN device 110 in decibel-milliwatts (dBm) and/or microwatts (μW). Receive power may represent or relate to, for example, an optical power received at the port 104 or at a port of the SAN device 110 in dBm and/or μW. Transceiver temperature may represent or relate to, for example, an internally measured temperature at the port 104 or at a port of the SAN device 110 in degrees. Supply voltage may represent or relate to, for example, an internally measured supply voltage at the port 104 or at a port of the SAN device 110 in millivolts (mV). Transmitter bias current may represent or relate to, for example, a transmitter bias current of the port 104 or of a port of the SAN device 110 in milliamps. The error counter may represent or relate to, for example, counts of errors such as bad data blocks, loss of signal, protocol errors, elapsed timers, certain control frames, cyclic redundancy check (CRC) errors, etc. at the port 104 or at a port of the SAN device 110. The operating link speed may represent or relate to, for example, a current operating speed at the port 104 or at a port of the SAN device 110 in bits per second (or gigabits per second, Gb/s). Link error status parameters may represent or relate to, for example, various error conditions indicated at the port 104 or at a port of the SAN device 110, such as a CRC error.

The transmitter 108 may send diagnostic data collected (polled) by the collector 106 to the target device 120 via an in-band data message 132. In some implementations, the transmitter 108 sends the in-band data message 132 to the target device 120 in response to an in-band diagnostic command 130 from the target device 120. The term "in-band" as used herein (e.g., with respect to an in-band data message and an in-band diagnostic command) may refer to communication over a data path of the SAN 100, that is, a channel over which data transfers may be routed. By contrast, the term "out-of-band" may refer to communication over a management path that is separate from the data path. For example, out-of-band communications may carry control signals over an Ethernet connection that is separate from the fabric of SAN 100.

Figure 2:
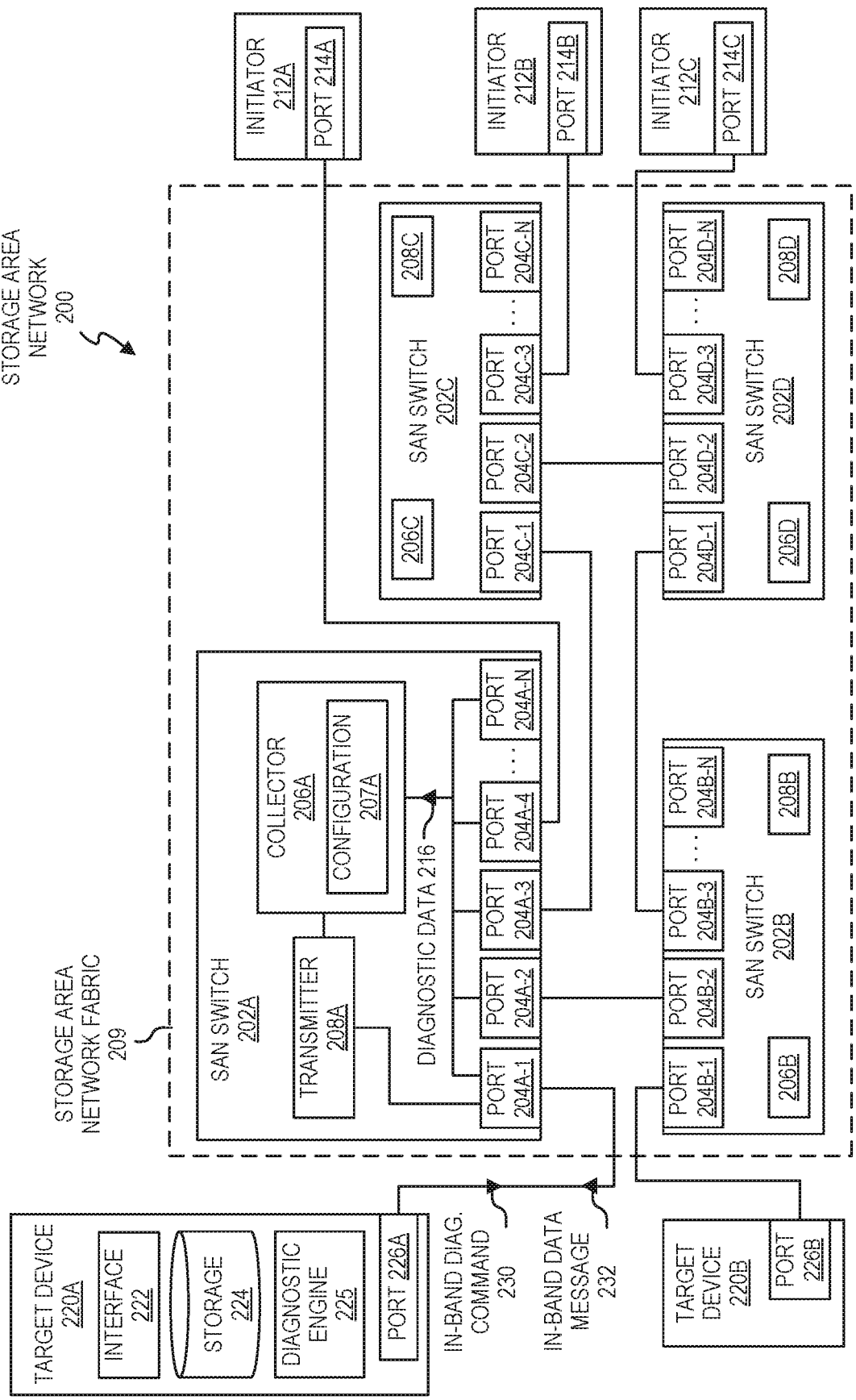
FIG. 2 is a block diagram that depicts an example storage area network in which diagnostic data can be sent to a storage area network target device, according to another implementation.

FIG. 2 is a block diagram of an example storage area network 200. The SAN 200 may include a plurality of SAN switches (e.g., SAN switches 202A, 202B, 202C, 202D, referred to herein collectively as SAN switches 202 or individually as a SAN switch 202). The SAN 200 also includes at least one initiator (e.g., initiator devices 212A, 2123, 2120, referred to herein collectively as initiators 212 or individually as an initiator 212) and at least one target device (e.g., target devices 220A, 220B, referred to herein collectively as target devices 220 or individually as a target device 220).

The SAN switches 202 may be similar in many respects to each other. Each of the switches 202 may have a plurality of ports (e.g., ports 204A-1 through 204A-N on switch 202A, ports 204B-1 through 204B-N on switch 202B, ports 204C-1 through 2040-N on switch 2020, ports 204C-1 through 2040-N on switch 2020). In some implementations, the SAN switch 202 and a port 204A may be analogous to the SAN switch 102 and the port 104, respectively.

Each of the switches 202 also may include a collector (e.g., collector 206A on switch 202A, collector 206B on switch 2023, collector 206C on switch 202C, collector 206D on switch 202D) and a transmitter (e.g., transmitter 208A on switch 202A, transmitter 208B on switch 202B, transmitter 208C on switch 2020, transmitter 208D on switch 202D). As with the collector 106 and the transmitter 108, the collectors 206A, 206B, 206C, 206D and the transmitters 208A, 208B, 208C, 208D may each include a series of instructions encoded on a machine readable storage medium and executable by a processor or processors (e.g., a microprocessor, an ASIC, an FPGA, and/or other hardware device suitable for retrieval and/or execution of instructions), and additionally or alternatively, may include one or more hardware devices including electronic circuitry or logic for implementing functionality described herein.

The switches 202 are networking devices that route data packets according to a block storage protocol. The structure and functionality of the switch 202A will be described in greater detail below, and it should be understood that the description of the switch 202A may be applicable to others of the switches (e.g., 202B, 2020, 202D).

The initiators 212 may be computing devices such as, for example, servers, desktop computers, workstations, laptop computers, or the like. Each initiator 212 may include at least one initiator port (e.g., initiator port 214A on initiator 212A, initiator port 214B on initiator 212B, initiator port 2140 on initiator 2120). The initiator port may be, for example, an Ethernet port of a network interface card or a Fibre Channel port of a Fibre Channel host bus adapter.

Target devices 220A and 220B may be similar in many respects. The structure and function of the target devices 220 will be described in greater detail with respect to the target device 220A, although it should be understood that the description of the target device 220A may be applicable to the target device 220B also. The target device 220A is a data storage device, and may include an interface 222, a storage device 224, a diagnostic engine 225, and a target device port 226A (similarly, as illustrated in FIG. 2, the target device 220B includes a target device port 2266).

The storage 224 of the target device 220A may include a disk array, a tape library, an optical storage device, or the like. The interface 222 and the diagnostic engine 225 may each include a series of instructions encoded on a machine readable storage medium and executable by a processor or processors of the target device 220A (e.g., a microprocessor, an ASIC, an FPGA, and/or other hardware device suitable for retrieval and/or execution of instructions), and additionally or alternatively, may include one or more hardware devices including electronic circuitry or logic for implementing functionality described herein. The target device 220A via the diagnostic engine 225 may orchestrate an in-band diagnostic data collection from the SAN 200, according to an example manner described below. For example, the diagnostic engine 225 may be implemented as the machine readable instructions described below with respect to FIG. 3 or 4 and/or may perform the methods described below with respect to FIG. 5 or 6.

The interface 222 of the target device 220A may include a graphical user interface (GUI) or a command line interface (CLI), and the interface 222 may connect wirelessly or by wire to an output device (e.g., a display, a monitor, a touchscreen device, etc.) and/or an input device (e.g., a keyboard, a mouse, a touchscreen device, etc.). A user may utilize the interface 222 (via the input device and/or the output device) to manage operational aspects of the target device 220A and other aspects of the SAN 200, such as the switches 202. Accordingly, the interface 222 may be referred to as a system user interface or a native system user interface (in contrast to additional non-native management tools that may be installed on the target device 220A).

The SAN switches 202 may form part of a SAN fabric 209. A SAN fabric refers to a network topology comprised of interconnected network switches that connects an initiator port of an initiator device to a target device port of a target device. As illustrated in FIG. 2, the SAN switches 202 may be interconnected, either directly or indirectly. As but one example, the SAN switch 202A may be connected to the SAN switch 202B (directly via ports 204A-2 and 204B-2), the SAN switch 202O (directly via ports 204A-3 and 204C-1), and the SAN switch 202D (indirectly, at least via the SAN switch 202C, and more particularly, via ports 204A-3, 204C-1, 204C-2, and 204D-2). Also as illustrated in FIG. 2, the initiator 212A connects to the SAN fabric 209 via ports 214A and 204A-4, the initiator 212B connects to the SAN fabric 209 via ports 214B and 204C-3, the initiator 212C connects to the SAN fabric 209 via ports 2140 and 204D-3 of the SAN switch 202D, the target device 220A connects to the SAN fabric 209 via ports 226A and 204A-1, and the target device 220B connects to the SAN fabric 209 via ports 226B and 204B-1.

The initiators 212 and the target devices 220 may be referred to collectively as SAN end devices (or individually as a SAN end device), by virtue of being a source or destination in the SAN 200. The initiators 212, the target devices 220, and the SAN switches 202 may be referred to collectively as SAN devices (or individually as a SAN device). Accordingly, SAN devices may include SAN end devices and SAN switches. It should be understood that the implementations described herein can be used or be adapted for use with SANs having greater or fewer components, different types of devices, and/or different network arrangements, without departing from a scope of the present disclosure.

Each SAN device may be identified and/or addressed by a unique world wide node name (WWWNN). Additionally, each port of the SAN devices may be identified and addressed by a unique world wide port name (WWPN). A SAN switch may have a name server database (e.g., in memory or storage of the SAN switch) that maintains a listing of WWNNs and WWPNs in the SAN 200, as well as the WWNNs and WWPNs of SAN devices directly connected to ports of the SAN switch. In some implementations, the name server database may maintain a listing of all connections between WWNNs and/or between WWPNs in the SAN 200.

Ports in a SAN device may be coupled to diagnostic hardware device(s). For example, ports may be included in a transceiver (e.g., small form-factor pluggable transceiver, quad small form-factor pluggable transceiver, etc.), and the transceiver may monitor diagnostic data about the operation of the ports, at least at the physical layer and/or the data link layer. The transceiver may store the diagnostic data locally in internal registers. A controller (e.g., an ASIC) of the SAN device may retrieve the diagnostic data from the transceiver registers.

In some implementations, the monitored diagnostic data may be analogous in many respects to diagnostic data 116 described above with respect to FIG. 1, and may include, for example, a transmit power, a receive power, a transceiver temperature, a supply voltage, a transmitter bias current, an error counter, an operating link speed, link error status parameters, and/or other such diagnostic data.

The switch 202A will now be described in greater detail, with respect to the handling of diagnostic data. The collector 206A of the switch 202A may poll diagnostic data 216 from each of the plurality of ports 204A and from the SAN devices connected to the plurality of ports 204A. More particularly, the collector 206A polls diagnostic data 216 about ports of the SAN devices directly connected to the plurality of ports 204A, that is, in the example of FIG. 2, about port 226A of the target device 220A, about ports 204B of the switch 202B, about ports 2040 of the switch 202C, and about port 214A of the initiator 212A.

For example, with respect to ports 204A on the same SAN switch 202 as the collector 206A, the collector 206A may utilize internal electrical connections of the SAN switch 202 to retrieve diagnostic data 216 from the transceiver(s) associated with the ports 204A. Alternatively, the collector 206A may request diagnostic data by addressing WWPNs of the ports 204A.

With respect to polling the SAN devices connected to the plurality of ports 204A, the collector 206A may identify which SAN devices are connected to the ports 204A by querying or examining the name server database. The collector 206A may then request diagnostic data 216 from the identified connected SAN devices, and more particularly, may request diagnostic data 216 regarding each port of those SAN devices. For example, the collector 206A may specify WWPN(s) when sending a diagnostic data request to a connected SAN device. In some implementations, the collector 206A may request diagnostic data from connected SAN devices using in-band commands. In response to a request for diagnostic data, a controller (e.g., an ASIC) of the SAN device receiving the request may retrieve diagnostic data locally stored at a transceiver associated with the port specified in the request and may transmit the retrieved diagnostic data back to the collector 206A as diagnostic data 216.

To illustrate, the collector 206A may determine that SAN switch 202A is connected to SAN switch 202B (via port 204A-2), and the collector 206A may proceed to request and receive diagnostic data 216 from the SAN switch 202B about ports 204B-1 through 204B-N. Similarly, the collector 206A may poll diagnostic data regarding ports 204C-1 through 2040-N from the SAN switch 202C, port 226A from the target device 220A, and port 214A from the initiator 212A.

The collector 206A may collect and store received diagnostic data 216 (from ports 204A and connected SAN devices) in memory or storage of the switch 202A. In some implementations, the collector 206A may poll diagnostic data 216 on a periodic basis, such as at polling intervals in a range from thirty (30) minutes to twenty-four (24) hours, or on any other scheduled basis. The periodic basis may be user configurable and may be stored in a configuration 207A.

Each of the SAN switches 202 may poll diagnostic data in the manner described above with respect to SAN switch 202A, and each SAN switch 202 may maintain, in memory or storage, diagnostic data about ports of the SAN switch 202 and about SAN devices connected to those ports. Additionally, each SAN switch 202 may send its diagnostic data to others of the SAN switches, as well as any data received from others of the SAN switches. Transmission of diagnostic data in this manner may be responsive to a diagnostic data request. Accordingly, in some implementations, a collector may synchronize (e.g., compile) fabric-wide diagnostic data based on diagnostic data polled by the collector and diagnostic data polled by the switches of the SAN fabric 209 received via the plurality of ports. Fabric-wide diagnostic data may be understood to be diagnostic data for at least a majority or all of the ports included in the SAN fabric 209, or more generally, in the SAN 200.

To illustrate, the SAN switch 202D may send diagnostic data about at least ports 204D and the initiator port 214C to a collector of SAN switch 202C. In turn, the SAN switch 202C may send, to the collector 206A of the SAN switch 202A, diagnostic data about at least ports 2040 and initiator port 214B, as well as the diagnostic data received from the SAN switch 202D. SAN switch 202B may send diagnostic data about at least ports 204B and target device port 226B to the collector 206A of the SAN switch 202A. The collector 206A may combine diagnostic data 216 polled by the collector 206A (e.g., about ports 204A, port 226A, ports 204B, ports 2040, and port 214A) with the diagnostic data received from the SAN switches 2023, 202C, and 202D to synchronize a fabric-wide diagnostic data.

The transmitter 208A may send collected diagnostic data via an in-band data message, whether data collected directly by collector 206A or any portion of fabric-wide diagnostic data synchronized to the collector 206A. In some examples, the transmitter 208A may send diagnostic data to other SAN switches 202 (e.g., to synchronize fabric-wide diagnostic data).

The target device 220A via the diagnostic engine 225 may transmit an in-band diagnostic command 230 to the SAN switch 202A (or another SAN switch of the SAN fabric 209). In response to the in-band diagnostic command 230 from the target device 220A, the transmitter 208A of the SAN switch 202A may send collected diagnostic data to the target device 220A via an in-band data message 232. In some implementations, the diagnostic engine 225 may choose to send different types of in-band diagnostic commands 230 in different situations, as will be described below with respect to at least FIGS. 4 and 6. In some implementations, diagnostic data sent by the transmitter 208A may depend on a type of the in-band diagnostic command 230. By virtue of sending an in-band diagnostic command 230 and receiving an in-band data message 232 in return, the target device 220A may poll diagnostic data about the SAN 200.

As one example type of an in-band diagnostic command 230, the target device 220A via the diagnostic engine 225 may send, to the SAN switch 202A, an in-band diagnostic command 230 requesting diagnostic data about a subset of the ports of the SAN switch 202A and SAN devices connected to the subset of ports. For convenience, such a command may be referred to herein as a "GDP-P" command, which denotes "Get Diagnostic Parameters for a Port/Subset of Ports." In response, the transmitter 208A may send, to the target device 220A, an in-band data message 232 containing diagnostic data 216 collected from a subset of the plurality of ports 204 and from SAN devices connected to the subset of the plurality of ports. For example, a GDP-P command to SAN switch 202A may request diagnostic data specifically for ports 204A-2, 204A-3. In response, the transmitter 208A may send diagnostic data 216 for port 204A-2, port 204A-3, ports 204B of the SAN device 202B connected via port 204A-2, and ports 204C of the SAN device 202C connected via port 204A-3.

As another example, the diagnostic engine 225 may send, to the SAN switch 202A, an in-band diagnostic command 230 requesting diagnostic data about all ports of the SAN switch 202A and SAN devices connected to the ports of the SAN switch 202A. For convenience, such a command may be referred to herein as a "GDP-S" command, which denotes "Get Diagnostic Parameters for Switch," In response, the transmitter 208A may send, to the target device 220A, an in-band data message 232 containing diagnostic data 216 collected from all of the plurality of ports 204 and from the SAN devices connected to the ports 204 (e.g., diagnostic data about ports 204B, 204C, 214A, and 226A). For example, if a SAN switch has thirty-two (32) ports and there are SAN devices connect to twenty (20) of those thirty-two ports, then the SAN switch may transmit to a target device, in response to a GDP-S command from the target device, an in-band data message containing diagnostic data about the thirty-two ports and the devices connected to those twenty ports.

As another example, the diagnostic engine 225 may send, to the SAN switch 202A, an in-band diagnostic command 230 requesting diagnostic data fabric-wide diagnostic data. For convenience, such a command may be referred to herein as a GDP-F command, which denotes "Get Diagnostic Parameters for Fabric." In response, the transmitter 208A may send, to the target device 220A, an in-band data message 232 containing fabric-wide diagnostic data that the collector 206A has synchronized, as described above.

In some implementations, an amount of diagnostic data to be transmitted by a SAN switch in response to an in-band diagnostic command may exceed the size of a data frame. In such situations, the in-band data message containing the diagnostic data may be a multi-frame sequence, and the data frames in the sequence may include information in their respective frame headers to facilitate the target device to extract the diagnostic data from the multi-frame sequence.

Figure 3:
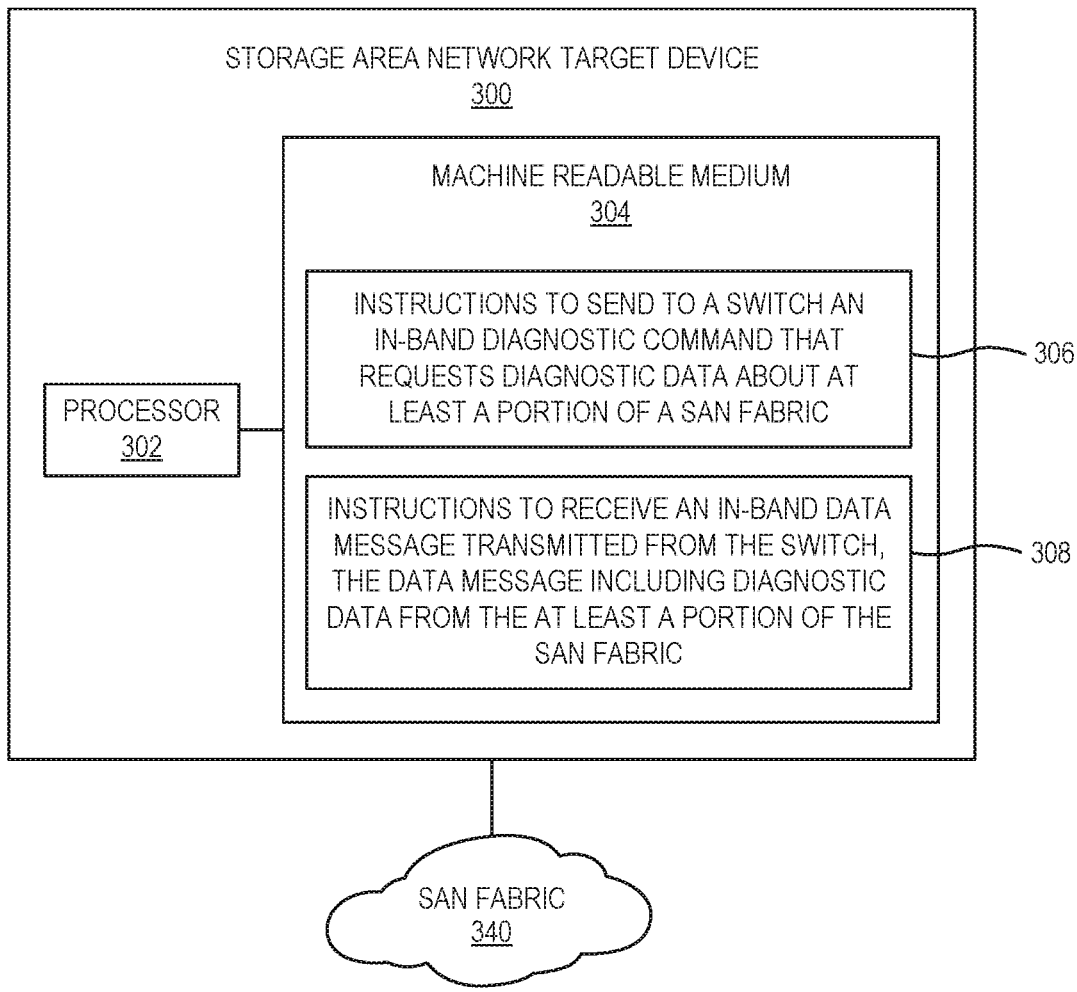
FIG. 3 is a block diagram of a storage area network target device that includes a non-transitory, machine readable medium encoded with example instructions to send an in-band diagnostic command and receive an in-band data message, according to an implementation.

FIG. 3 is a block diagram illustrating a storage area network target device 300 (also referred to herein as "target device" for convenience) that includes a non-transitory machine readable medium 304 encoded with example instructions to poll diagnostic data about a SAN by sending an in-band diagnostic command and receiving an in-band data message. In some implementations, the target device 300 may serve as or form part of the target device 120 of FIG. 1 or the target device 220A or 220B of FIG. 2, or more particularly, may serve as or form part of the diagnostic engine 225 of the target device 220A. In some implementations, the target device 300 may include at least one processor 302 coupled to a machine readable medium 304. The target device 300 also may include a networking component, such as a network adapter (e.g., for Ethernet or Fibre Channel protocols) for communication with a SAN fabric 340.

The processor 302 may include a single-core processor, a multi-core processor, an ASIC, an FPGA, and/or other hardware device suitable for retrieval and/or execution of instructions from the machine readable medium 304 (e.g., instructions 306, 308) to perform functions related to various examples. Additionally or alternatively, the processor 302 may include electronic circuitry for performing the functionality described herein, including, but not limited to, the functionality of instructions 306, 308. With respect to the executable instructions represented as boxes in FIG. 3, it should be understood that part or all of the executable instructions and/or electronic circuits included within one box may, in alternate implementations, be included in a different box shown in the figures or in a different box not shown.

The machine readable medium 304 may be any medium suitable for storing executable instructions, such as random access memory (RAM), electrically erasable programmable read-only memory (EEPROM), flash memory, hard disk drives, optical discs, or the like. In some example implementations, the machine readable medium 304 may be a tangible, non-transitory medium, where the term "non-transitory" does not encompass transitory propagating signals. The machine readable medium 304 may be disposed within the target device 300, as shown in FIG. 3, in which case the executable instructions may be deemed "installed" or "embedded" on the target device 300. Alternatively, the machine readable medium 304 may be a portable (e.g., external) storage medium, for example, that allows the target device 300 to remotely execute the instructions or download the instructions from the storage medium. In this case, the executable instructions may be part of an "installation package." As described further herein below, the machine readable medium 304 may be encoded with a set of executable instructions 306, 308.

Instructions 306, when executed by the processor 302, may send to a switch included in a SAN fabric 340 an in-band diagnostic command that requests diagnostic data about at least a portion of the SAN fabric 340. The portion of the SAN fabric 340 may include a port of the switch and a SAN device connected to the port. For example, parameters such as WWPN and/or WWNN may accompany the in-band diagnostic command to specify the portion of the SAN fabric 340 for which diagnostic data is requested. The diagnostic data requested may be analogous in many respects to diagnostic data 116 and 216 described above.

Instructions 308, when executed by the processor 302, may receive an in-band data message transmitted from the switch in response to the in-band diagnostic command. The data message may include diagnostic data from the at least a portion of the SAN fabric 340, as requested.

Figure 4:
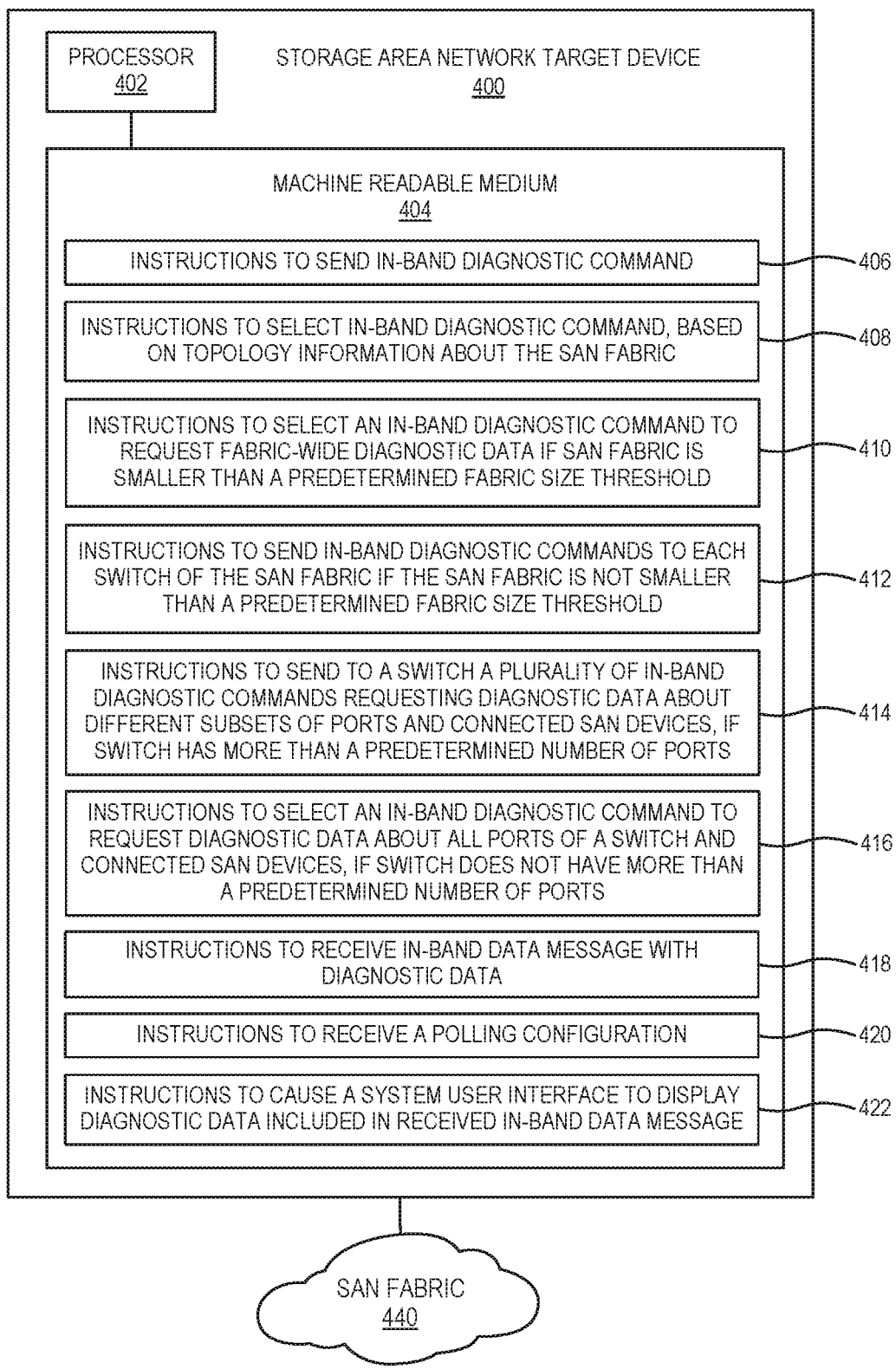
FIG. 4 is a block diagram of a storage area network target device that includes a non-transitory, machine readable medium encoded with example instructions to send an in-band diagnostic command and receive an in-band data message, according to another implementation.

FIG. 4 is a block diagram of a storage area network target device 400 ("target device") that includes a non-transitory, machine readable medium 404 encoded with example instructions to poll diagnostic data about a SAN by sending an in-band diagnostic command and receiving an in-band data message. In some implementations, the target device 400 may serve as or form part of the target device 120 of FIG. 1 or the target device 220A or 220B of FIG. 2, or more particularly, may serve as or form part of the diagnostic engine 225 of the target device 220A.

The target device 400 includes a processor 402 and a machine readable medium 404, which may be analogous in many respects to the processor 302 and the machine readable medium 304, respectively. The machine readable medium 404 may be encoded with a set of executable instructions 406, 408, 410, 412, 414, 416, 418, 420, 422. Additionally or alternatively, the processor 402 may include electronic circuitry for performing the functionality described herein, including, but not limited to, the functionality of instructions 406, 408, 410, 412, 414, 416, 418, 420, 422. As with the target device 300, the target device 400 also may include a networking component, such as a network adapter (e.g., for Ethernet or Fibre Channel protocols) for communication with a SAN fabric 440.

Instructions 406, when executed by the processor 402, may send to a switch (which may be analogous to SAN switch 202A) included in a SAN fabric 440 (which may be analogous to SAN fabric 209) an in-band diagnostic command that requests diagnostic data about at least a portion of the SAN fabric 440. Instructions 406 may be analogous in many respects to instructions 306. For example, the in-band diagnostic command may request diagnostic data about a port of the switch and any SAN device connected to that port.

Instructions 408, when executed by the processor 402, may select an in-band diagnostic command to send to a switch from among a plurality of in-band diagnostic commands, based on topology information about the SAN fabric 440. For example, the in-band diagnostic commands may include the GDP-F, GDP-P, and GDP-S commands described above. The selected in-band diagnostic command may be sent via instructions 406.

As part of instructions 406, the target device 400 may request (e.g., via an in-band communication or an out-of-band communication) the topology information about the SAN fabric 440 from the switch or from any switch in the SAN fabric 440. The topology information may indicate, for example, the total number of ports in the SAN fabric 440 or the number of ports for each SAN device in the SAN fabric 440.

Instructions 410, when executed by the processor 402, may select an in-band diagnostic command to request fabric-wide diagnostic data (e.g., the GDP-F command) if topology information about the SAN fabric 440 indicates the SAN fabric 440 is smaller than a predetermined fabric size threshold. In other words, instructions 410 may be executed if the topology information, such as the total number of ports in the SAN fabric 440, is smaller than the predetermined fabric size threshold. In but one illustration, the predetermined fabric size threshold may be 128 ports. The selected in-band diagnostic command may be sent via instructions 406.

Instructions 412, when executed by the processor 402, may send in-band diagnostic commands to each switch included in the SAN fabric 440 if a topology information about the SAN fabric 440 indicates that the SAN fabric 440 is not smaller than a predetermined fabric size threshold. For example, instructions 412 may be executed if the topology information indicates that the total number of ports in the SAN fabric 440 is greater than or equal to the predetermined fabric size threshold (e.g., 128 ports). The in-band diagnostic commands sent to each respective switch may request either diagnostic data about a subset of ports of the respective switch (e.g., via the GDP-P command) or diagnostic data about all of the ports of the respective switch (e.g., via the GDP-S command).

Instructions 414, when executed by the processor 402, may send (or select to send) to a switch a plurality of in-band diagnostic commands that together request diagnostic data about all ports of the switch and SAN devices connected to the ports. Particularly, instructions 414 may be executed if a topology information about the SAN fabric 440 indicates that the switch has more than a predetermined number of ports, such as thirty-two (32) ports. Each of the plurality of in-band diagnostic commands sent by instructions 414 may request diagnostic data about a different subset of ports of the switch and SAN devices connected to the different subset of ports. For example, instructions 414 may specify the subset of ports by WWPNs. In some implementations, each of the plurality of in-band diagnostic commands may be a GDP-P command. In some implementations, instructions 414 may be executed in conjunction with instructions 406 or 412.

Instructions 416, when executed by the processor 402, may select an in-band diagnostic command to request diagnostic data about all ports of a switch and SAN devices connected to all of the ports of the switch (e.g., the GDP-S command). Particularly, instructions 416 may be executed if a topology information about the SAN fabric 440 indicates that the switch does not has more than a predetermined number of ports (e.g., 32 ports). In some implementations, instructions 414 may be executed in conjunction with instructions 406 or 412.

Instructions 418, when executed by the processor 402, may receive an in-band data message transmitted from a switch in response to an in-band diagnostic command (e.g., an in-band diagnostic command sent by instructions 406, 412, or 414). The data message may include diagnostic data from the at least a portion of the SAN fabric 440 specified by the in-band diagnostic command. The diagnostic data requested may be analogous in many respects to diagnostic data 116 and 216 described above.

In some implementations, instructions to poll diagnostic data from a switch or switches by the target device 400 (e.g., instructions to send an in-band diagnostic command and to receive an in-band data message in response) may be performed periodically. Instructions 420, when executed by the processor 402, may receive a polling configuration that controls a polling interval at which to send an in-band diagnostic command (e.g., via instructions 406, 412, or 414). For example, instructions 420 may receive the polling configuration from a user via an input device of the target device 400 (e.g., a keyboard, a mouse, a touchscreen device, etc.) and/or an interface (e.g., interface 222). The polling configuration may be a numerical value for the polling interval, a polling schedule, or the like. In some examples, the polling interval may be in a range from thirty (30) minutes to twenty-four (24) hours.

Instructions 422, when executed by the processor 402, may cause a target system user interface of the target device 400 to display the diagnostic data included in the received in-band data message (e.g., received by instructions 418). For example, the diagnostic data may be displayed on an output device (e.g., a monitor, a display, a touchscreen device, etc.) by a CLI or GUI of the target system user interface (e.g., interface 222).

Figure 5:
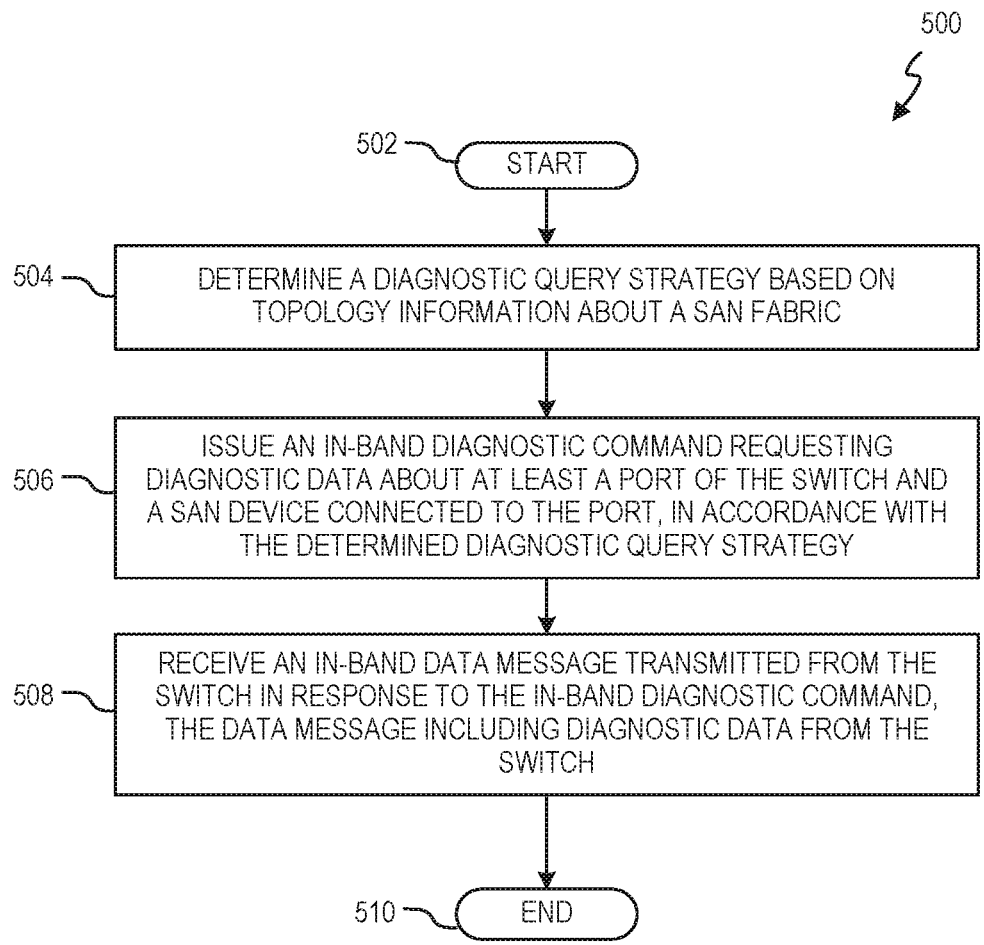
FIG. 5 is a flowchart of an example method for issuing an in-band diagnostic command and receiving an in-band data message including diagnostic data, according to an implementation.

FIG. 5 is a flowchart of an example method 500 for polling diagnostic data about a SAN by issuing an in-band diagnostic command and receiving an in-band data message including diagnostic data. Method 500 may be implemented in the form of executable instructions stored on a machine readable storage medium and executed by at least one processor and/or in the form of electronic circuitry. For example, method 500 may be described below as being executed or performed by the target device 220A of FIG. 2. More particularly, method 500 may be implemented by the diagnostic engine 225 of the target device 220A. Various other suitable components and systems may be used as well to perform at least part of method 500, such as the target device 120 of FIG. 1, the target device 220B of FIG. 2, the SAN target device 300 of FIG. 3, or the SAN target device 400 of FIG. 4.

In some implementations of the present disclosure, one or more blocks of method 500 may be executed substantially concurrently or in a different order than shown in FIG. 5. In some implementations of the present disclosure, method 500 may include more or less blocks than are shown in FIG. 5. In some implementations, one or more of the blocks of method 500 may, at certain times, be ongoing and/or may repeat.

The method 500 may begin at block 502, and continue to block 504, where a SAN target device connected to a SAN fabric may determine a diagnostic query strategy based on topology information about the SAN fabric. An example process for determining a diagnostic query strategy will be described further herein below with respect to FIG. 6.

At block 506, the target device may issue to a switch included in the SAN fabric an in-band diagnostic command requesting diagnostic data about at least a port of the switch and a SAN device connected to the port, in accordance with the determined diagnostic query strategy. To illustrate with respect to the SAN depicted in FIG. 2, the target device 220A may issue an in-band diagnostic command to the SAN switch 202A included in the SAN fabric 209, the in-band diagnostic command requesting diagnostic data about at least a port (e.g., 204A-2) and a SAN device connected to the port (e.g., SAN switch 202B). The diagnostic data requested may be analogous in many respects to diagnostic data 116 and 216 described above.

At block 508, the target device may receive an in-band data message transmitted from the switch in response to the in-band diagnostic command issued at block 506. The data message may include the diagnostic data requested by the in-band diagnostic command. The method 500 may end at block 510.

Figure 6:
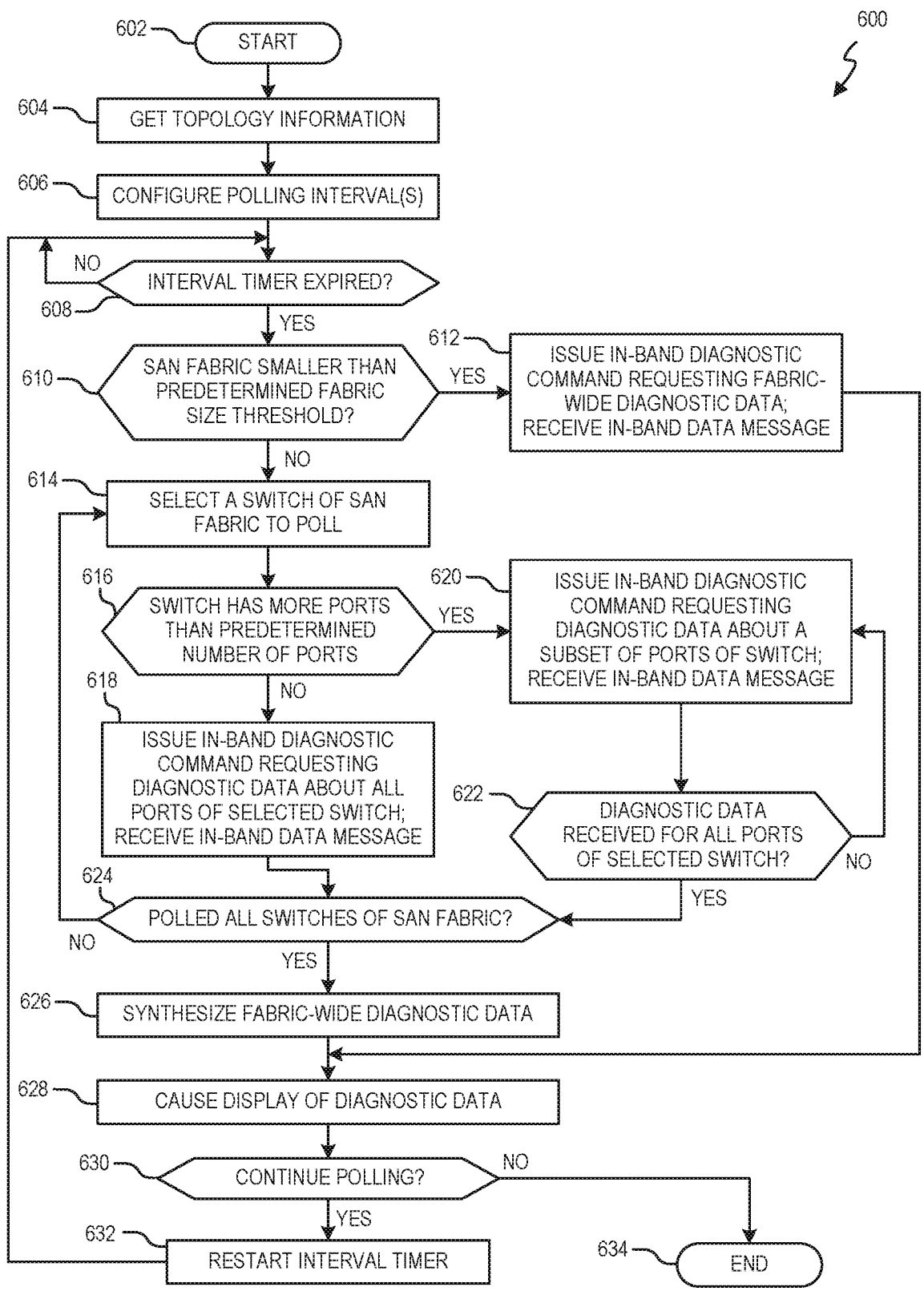
FIG. 6 is a flowchart of an example method for issuing an in-band diagnostic command and receiving an in-band data message including diagnostic data, according to another implementation.

FIG. 6 is a flowchart of an example method 600 for polling diagnostic data about a SAN by issuing an in-band diagnostic command and receiving an in-band data message including diagnostic data, according to another implementation. Method 600 may be implemented in the form of executable instructions stored on a machine readable storage medium and executed by at least one processor, and/or may be implemented in the form of electronic circuitry. As with method 500, method 600 may be executed or performed by the target device 220A. More particularly, method 600 may be performed by the diagnostic engine 225 of the target device 220A. Various other suitable components and systems may be used as well to perform at least part of method 600, such as the target device 120 of FIG. 1, the target device 220B of FIG. 2, the SAN target device 300 of FIG. 3, or the SAN target device 400 of FIG. 4.

In some implementations of the present disclosure, one or more blocks of method 600 may be executed substantially concurrently or in a different order than shown in FIG. 6. In some implementations of the present disclosure, method 600 may include more or less blocks than are shown in FIG. 6. In some implementations, one or more of the blocks of method 600 may, at certain times, be ongoing and/or may repeat.

Method 600 may be useful for polling diagnostic data by a target device connected to a SAN fabric that includes a plurality of switches. The polled diagnostic data may be analogous in many respects to diagnostic data 116 and 216 described above. In relation to method 600, each of the plural switches in such a SAN fabric may be identifiable as a first category switch or a second category switch. A first category switch may be defined as a SAN switch having more ports than a predetermined number of ports according to topology information about the SAN fabric. A second category switch may be defined as a SAN switch not having more ports than the predetermined number of ports according to the topology information. As but one example, the predetermined number of ports may be thirty-two (32).

The method 600 may begin at block 602, and continue to block 604, where the target device gets topology information about the SAN fabric to which the target device is connected. The topology information may indicate, for example, the total number of ports in the SAN fabric or the number of ports for each SAN device in the SAN fabric. The target device may get the topology information from a switch in the SAN fabric.

At block 606, the target device may configure a polling interval. For example, the target device may receive, via an interface and an input device (e.g., a keyboard, a mouse, a touchscreen device, etc.) a polling configuration that includes a numerical polling interval (e.g., a value in the range from thirty minutes to twenty-four hours), and the target device may set up an interval timer based on the polling interval.

At decision block 608, the target device checks if the interval timer has expired. If the interval timer has not expired ("NO" at decision block 608), the interval timer is decremented and decision block 608 repeats. If the interval timer has expired ("YES" at decision block 608), the target device (or in particular, a diagnostic engine thereof) proceeds to determine and carry out a diagnostic query strategy based on the topology information about the SAN fabric by performing blocks 610, 612, 614, 616, 618, 620, 622, 624, and/or 626.

At decision block 610, the target device checks if the topology information received at block 604 indicates that the SAN fabric is smaller than a predetermined fabric size threshold. In but one example, the predetermined fabric size threshold may be 128 ports.

If the topology information indicates that the SAN fabric is smaller than a predetermined fabric size threshold ("YES" at decision block 610), control passes to block 612. At block 612, the target device determines that, owing to the SAN fabric being smaller than the predetermined fabric size threshold, the diagnostic query strategy is to issue to a switch an in-band diagnostic command requesting fabric-wide diagnostic data (e.g., a GDP-F command, as discussed above). The target device may proceed to issue the in-band diagnostic command requesting fabric-wide diagnostic data to a switch of the SAN fabric, and may receive in return from that switch an in-band data message containing the requested fabric-wide diagnostic data. In some implementations, above-described instructions 410 may relate to blocks 610 and 612 of method 600. After block 612, control may pass to block 628.

Returning to decision block 610, if the topology information indicates that the SAN fabric is not smaller than the predetermined fabric size threshold ("NO" at decision block 610), the target device determines that the diagnostic query strategy is to poll each of the plural switches separately and synthesize fabric-wide diagnostic data, and the target device proceeds to block 614. By virtue of polling each switch separately and synthesizing a fabric-wide diagnostic data, a target device may efficiently obtain a large amount of diagnostic data associated with a large SAN fabric without burdening a particular switch with a request for the entire fabric-wide diagnostic data.

At block 614, the target device selects a switch of the SAN fabric that has not yet been polled. At decision block 616, the target device determines from the topology information if the switch selected at block 614 has more ports than a predetermined number of ports. That is, the target device determines if the selected switch is a first category switch or a second category switch.

If the selected switch is a first category switch ("YES" at decision block 616), control passes to block 620, where the target device issues to the selected switch an in-band diagnostic command requesting diagnostic data about a subset of ports of the selected switch and SAN devices connected to that subset of ports. For example, the target device may issue the above-described GDP-P command. In some examples, the target device may request diagnostic data about a subset having up to thirty-two (32) ports and the SAN devices connected thereto. The target device may specify the ports via WWPNs. The target device also receives an in-band data message from the selected switch in return.

At decision block 622, the target device determines if diagnostic data has been received for all ports of the switch selected at block 614. If diagnostic data has been received for all ports ("YES" at decision block 622), control passes to decision block 624. If diagnostic data has not been received for all ports ("NO" at decision block 622), control returns to block 620 and the target device issues another in-band diagnostic command to request diagnostic data about a different subset of ports. Blocks 620 and 622 iterate until all ports of the selected switch have been polled.

To illustrate, if the SAN switch 202A of FIG. 2 has 128 ports, the target device 220A may iterate through blocks 620 and 622 and issue to the SAN switch 202A a GDP-P command specifying ports 204A-1 through 204A-32, a GDP-P command specifying ports 204A-33 through 204A-64, a GDP-P command specifying ports 204A-65 through 204A-96, and a GDP-P command specifying ports 204A-97 through 204A-128. Each of the example GDP-P commands also request diagnostic data regarding SAN devices connected to the specified ports.

Accordingly, by performing blocks 620 and 622, the target device issues to the first category switch selected by block 614, a plurality of in-band diagnostic commands that together request diagnostic data about all ports of that first category switch and SAN devices connected to ports of that first category switch, each in-band diagnostic command requesting diagnostic data about a different subset of ports of the first category switch and SAN devices connected to the different subset of ports. In some implementations, above-described instructions 414 may relate to blocks 616, 620, and 622.

Returning to decision block 616, if the selected switch is a second category switch (i.e., the switch does not have more ports than the predetermined number of ports), control passes to block 618 where the target device issues to the second category switch an in-band diagnostic command requesting diagnostic data about all ports of the second category switch and SAN devices connected the ports of the second category switch (e.g., a GDP-S command). In some implementations, above-described instructions 416 may relate to blocks 616 and 618. After block 618, control passes to decision block 624.

At decision block 624, the target device determines if all switches in the SAN fabric have been polled. If all switches have not been polled ("NO" at decision block 624), control returns to block 614 and a switch that has not yet been polled is selected for polling. If all switches have been polled ("YES" at decision block 624), control passes to block 626. In some implementations, above-described instructions 412 may relate to blocks 614 and 624. At block 626, the target device synthesizes (e.g., compiles) a fabric-wide diagnostic data from diagnostic data collected from each switch of the SAN fabric.

At block 628, the target device may cause display of fabric-wide diagnostic data or a portion thereof, whether received from a switch at block 612 or synthesized at block 626, on an output device (e.g., a monitor, a display, a touchscreen device, etc.) via a system user interface. For example, the system user interface may be a CLI or GUI that is native to the target device. In some implementations, the target device may analyze the diagnostic data to derive trends, failure predictions, summaries, or the like, and may cause display of such analysis. In some implementations, above-described instructions 422 may relate to block 628.

At decision block 630, the target device determines whether to continue polling. For example, a user may deactivate polling via the system user interface. If polling is to continue ("YES" at decision block 630), the interval timer is reset to the polling interval at block 632 and control returns to block 608. If polling is not to continue ("NO" at decision block 630), control passes to block 634, where method 600 ends.

Figure 7:
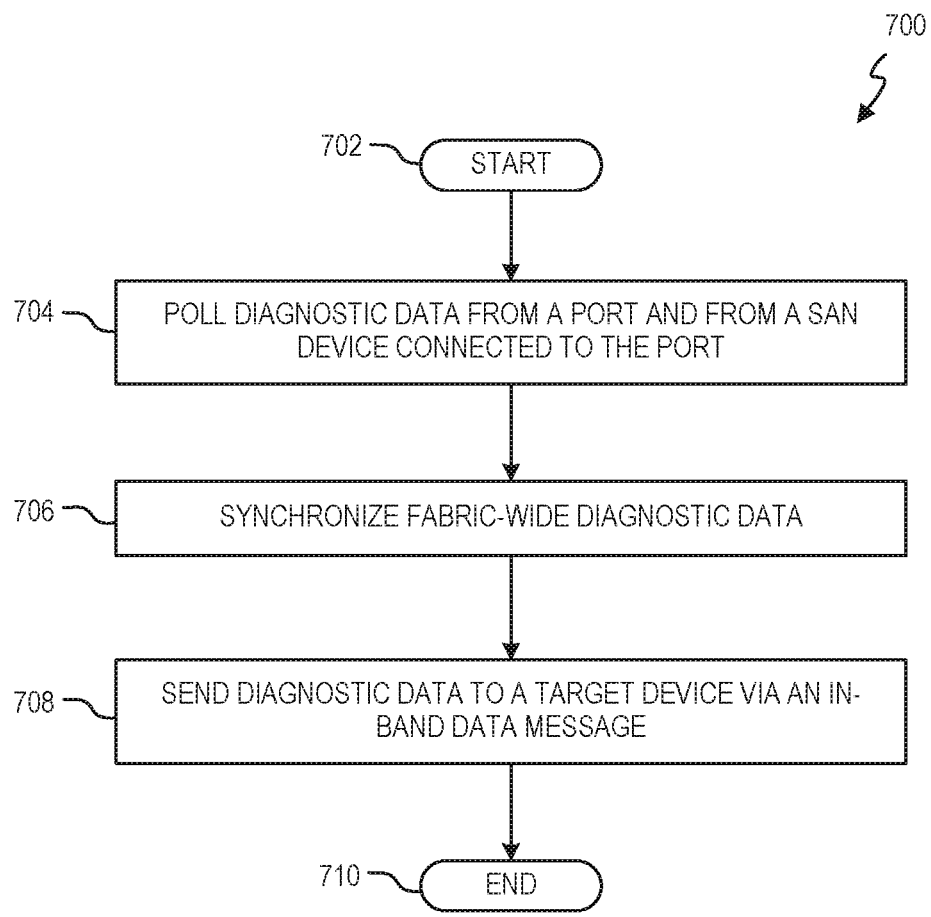
FIG. 7 is a flowchart of an example method for polling diagnostic data at a SAN switch, according to an implementation.

FIG. 7 is a flowchart of an example method 700 for polling diagnostic data at a SAN switch, according to an implementation. Method 700 may be implemented in the form of executable instructions stored on a machine readable storage medium and executed by at least one processor, and/or may be implemented in the form of electronic circuitry. Method 700, may be executed or performed by a SAN switch in a SAN fabric, such as the SAN switch 102 of FIG. 1 or the SAN switches 202 of FIG. 2.

In some implementations of the present disclosure, one or more blocks of method 700 may be executed substantially concurrently or in a different order than shown in FIG. 7. In some implementations of the present disclosure, method 700 may include more or less blocks than are shown in FIG. 7. In some implementations, one or more of the blocks of method 700 may, at certain times, be ongoing and/or may repeat.

The method 700 may begin at block 702, and continue to block 704, where the SAN switch may poll (i.e., request and receive) diagnostic data about a port of the SAN switch and about a SAN device connected to that port (or more particularly, about port(s) of the connected SAN device). At block 706, the SAN device may request and receive diagnostic data polled by other SAN switches of the SAN fabric. Also at block 706, the SAN device may synchronize a fabric-wide diagnostic data based on diagnostic data polled by the SAN switch as well as the diagnostic data received from the other SAN switches. At block 708, the SAN switch may send diagnostic data polled at block 704 and/or fabric-wide diagnostic data synchronized at block 706 to a target device via an in-band data message. The SAN switch may send the diagnostic data in response to an in-band diagnostic command from the target device. The method 700 may end at block 710.

In view of the foregoing description, it can be appreciated that diagnostic data about a storage area network may be accessed from a single point, namely via a system user interface of a target device connected to the fabric of the storage area network. Moreover, such diagnostic data may be accessed in a streamlined manner and with minimal user effort, by virtue of a target device that intelligently issues in-band diagnostic commands to retrieve or synthesize fabric-wide diagnostic data from switches that autonomously collect diagnostic data about the storage area network. Additionally, by virtue of the target device intelligently selecting a type of in-band diagnostic command to issue based on fabric topology, a balance may be attained between the time duration to obtain fabric-wide diagnostic data and resource burdens (e.g., computational or bandwidth burdens) placed on the switches providing the fabric-wide diagnostic data.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed:

1. A storage area network (SAN) switch comprising:
a plurality of ports;
a collector to:
poll diagnostic data from the plurality of ports and from SAN devices connected to the plurality of ports, and
receive diagnostic data collected by other SAN switches of a SAN fabric that includes the SAN switch, the received diagnostic data including data about ports of the other SAN switches and SAN devices connected to the ports of the other SAN switches; and
a transmitter to
respond to one or more in-band diagnostic commands sent by a SAN target device by sending an in-band data message back to the SAN target device with diagnostic data requested by the one or more in-band diagnostic commands,
wherein the SAN fabric includes the SAN switch and the other SAN switches,
wherein the SAN target device determines that:
if topology information about the SAN fabric indicates that the SAN fabric is smaller than a predetermined fabric size threshold, a diagnostic query strategy is to issue to the SAN switch, as the one or more in-band diagnostic commands, an in-band diagnostic command requesting fabric-wide diagnostic data about the SAN fabric,
if the topology information indicates that the SAN fabric is not smaller than the predetermined fabric size threshold, the diagnostic query strategy is to poll diagnostic data from each SAN switch of the SAN fabric separately and synthesize fabric-wide diagnostic data from polled diagnostic data from each SAN switch,
if the diagnostic query strategy is to poll diagnostic data from each SAN switch of the SAN fabric and the SAN switch has more than a predetermined number of ports according to the topology information, then issue, as the one or more in-band diagnostic commands, a plurality of in-band diagnostic commands that each request diagnostic data about a different subset of ports of the SAN switch and about SAN devices connected to the different subset of ports, wherein the plurality of in-band diagnostic commands together request diagnostic data about all ports of the SAN switch, and
if the diagnostic query strategy to poll diagnostic data from each SAN switch of the SAN fabric and the SAN switch does not have more than the predetermined number of ports according to the topology information, then issue, as the one or more in-band diagnostic commands, an in-band diagnostic command to request diagnostic data about all ports of the SAN switch and about SAN devices connected to all ports of the SAN switch.

2. The SAN switch of claim 1, wherein the collector is to poll diagnostic data on a periodic basis.

3. The SAN switch of claim 1, wherein the diagnostic data includes a transmit power, a received power, a transceiver temperature, a supply voltage, a transmitter bias current, an error counter, or an operating link speed.

4. The SAN switch of claim 1, wherein
the SAN devices connected to the plurality of ports and the SAN devices connected to the ports of the other SAN switches include switches and SAN end devices.

5. The SAN switch of claim 1, wherein the collector is to request and receive diagnostic data from a second SAN switch connected to a port of the plurality of ports, the diagnostic data from the second SAN switch including diagnostic data about ports of the second SAN switch and about SAN devices connected to the ports of the second SAN switch, and
wherein the transmitter is to send compiled diagnostic data that includes 1) the diagnostic data received from the second SAN switch and 2) the diagnostic data from the plurality of ports and from SAN devices connected to the plurality of ports.

6. The SAN switch of claim 5, wherein the transmitter is to send the compiled diagnostic data to a third switch.

7. The SAN switch of claim 1, wherein the collector uses an in-band command to request diagnostic data from SAN switches connected to the plurality of ports.

8. The SAN switch of claim 1, wherein the collector is to synthesize the fabric-wide diagnostic data by combining the polled diagnostic data and the received diagnostic data.

9. The SAN switch of claim 1, wherein the transmitter is to respond to a received in-band diagnostic data request from another SAN switch by sending, to the another SAN switch and via an in-band data message directed to the another SAN switch, the polled diagnostic data and the received diagnostic data.

10. A non-transitory machine readable medium, storing instructions executable by a processor of a storage area network (SAN) target device connected to a SAN fabric that includes a plurality of interconnected SAN switches, the non-transitory machine readable medium comprising:
instructions to determine that, if topology information about the SAN fabric indicates that the SAN fabric is smaller than a predetermined fabric size threshold, a diagnostic query strategy is to include issuing an in-band diagnostic command requesting fabric-wide diagnostic data about the SAN fabric to a SAN switch of the SAN fabric;
instructions to determine that, if the topology information indicates that the SAN fabric is not smaller than the predetermined fabric size threshold, the diagnostic query strategy is to poll diagnostic data from each SAN switch of the SAN fabric separately and synthesize fabric-wide diagnostic data from polled diagnostic data from each SAN switch;
instructions to determine that the diagnostic query strategy to poll diagnostic data from each SAN switch further includes issuing, to each SAN switch of the SAN fabric that has more than a predetermined number of ports according to the topology information, a plurality of in-band diagnostic commands that each request diagnostic data about a different subset of ports of the SAN switch having more than the predetermined number of ports and SAN devices connected to the different subset of ports, wherein the plurality of in-band diagnostic commands together request diagnostic data about all ports of the SAN switch having more than the predetermined number of ports;
instructions to determine that the diagnostic query strategy to poll diagnostic data from each SAN switch further includes issuing, to each SAN switch of the SAN fabric that does not have more than the predetermined number of ports according to the topology information, an in-band diagnostic command to request diagnostic data about all ports of the SAN switch not having more than the predetermined number of ports and about SAN devices connected to all of the ports;
instructions to execute the diagnostic query strategy as determined; and
instructions to receive an in-band data message transmitted by a given SAN switch of the SAN fabric containing diagnostic data according to an in-band diagnostic command issued to the given SAN switch.

11. The non-transitory machine readable medium of claim 10, further comprising instructions to receive a polling configuration that controls a polling interval at which to execute the diagnostic query strategy.

12. The non-transitory machine readable medium of claim 10, wherein the diagnostic query strategy is dependent on the topology information about the SAN fabric, including a size of the SAN fabric.

13. The non-transitory machine readable medium of claim 10, further comprising instructions to cause a target system user interface of the SAN target device to display the diagnostic data contained in the received in-band data message.

14. The non-transitory machine readable medium of claim 10, further comprising instructions to synthesize fabric-wide diagnostic data by combining diagnostic data received from each SAN switch in the SAN fabric, if the topology information indicates that the SAN fabric is not smaller than the predetermined fabric size threshold.

15. The non-transitory machine readable medium of claim 10, wherein whether the SAN fabric is smaller than the predetermined fabric size threshold depends on whether a total number of ports in the SAN fabric as indicated in the topology information is less than the predetermined fabric size threshold.

16. The non-transitory machine readable medium of claim 15, wherein the predetermined fabric size threshold is 128 ports, and the predetermined number of ports is 32 ports.

17. A method comprising:
determining, by a storage area network (SAN) target device connected to a SAN fabric that includes a plurality of interconnected SAN switches, that, if topology information about the SAN fabric indicates that the SAN fabric is smaller than a predetermined fabric size threshold, a diagnostic query strategy is to include issuing an in-band diagnostic command requesting fabric-wide diagnostic data about the SAN fabric to a SAN switch of the SAN fabric;
determining, by the SAN target device, that, if the topology information indicates that the SAN fabric is not smaller than the predetermined fabric size threshold, the diagnostic query strategy is to poll diagnostic data from each SAN switch of the SAN fabric separately and synthesize fabric-wide diagnostic data from polled diagnostic data from each SAN switch;
determining, by the SAN target device, that the diagnostic query strategy to poll diagnostic data from each SAN switch further includes issuing, to each SAN switch of the SAN fabric that has more than a predetermined number of ports according to the topology information, a plurality of in-band diagnostic commands that each request diagnostic data about a different subset of ports of the SAN switch having more than the predetermined number of ports and about SAN devices connected to the different subset of ports, wherein the plurality of in-band diagnostic commands together request diagnostic data about all ports of the SAN switch having more than the predetermined number of ports;

determining, by the SAN target device, that the diagnostic query strategy to poll diagnostic data from each SAN switch further includes issuing, to each SAN switch of the SAN fabric that does not have more than the predetermined number of ports according to the topology information, an in-band diagnostic command to request diagnostic data about all ports of the SAN switch not having more than the predetermined number of ports and about SAN devices connected to the all ports of the SAN switch;

executing, by the SAN target device, the diagnostic query strategy as determined; and receiving, by the SAN target device, an in-band data message transmitted by a given SAN switch according to a diagnostic command issued to the given switch during the executing.

18. The method of claim 17, further comprising:

retrieving, by the SAN target device, the topology information from the SAN fabric;

configuring, by the SAN target device, a polling interval that determines when the determining and the issuing are performed; and causing, by the SAN target device, a user interface to display the requested diagnostic data included in the received in-band data message.

19. The method of claim 17, further comprising synthesizing, by the SAN target device, fabric-wide diagnostic data by combining diagnostic data received via polling each of the plurality of SAN switches.

* * * * *